Jan. 9, 1923. Re. 15,520.
C. CONOVER.
APPARATUS FOR BRINGING ABOUT AND CONTROLLING REACTIONS BETWEEN GASES.
ORIGINAL FILED DEC. 9, 1919. 3 SHEETS—SHEET 1.
FIG. I.
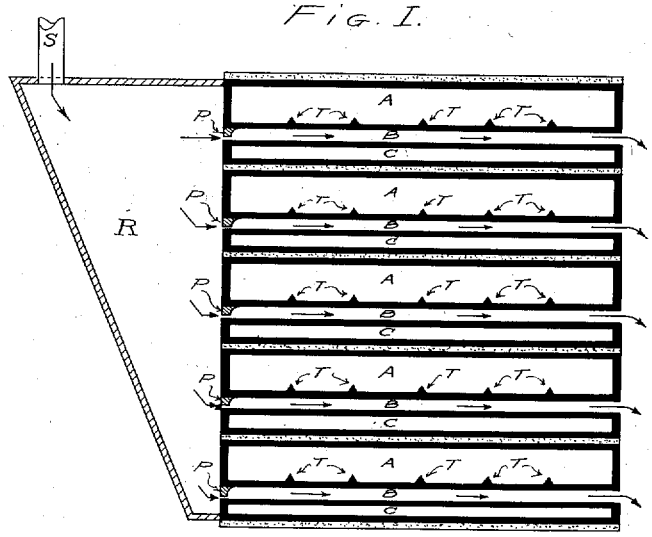
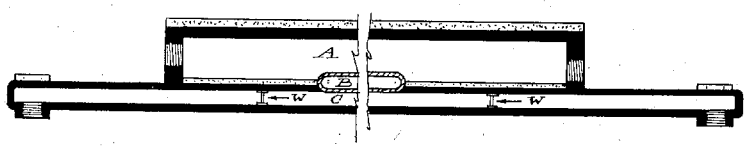
FIG. 2.
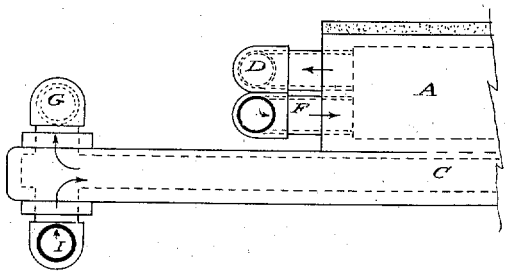
FIG. 3.
Courtney Conover Inventor Jan. 9, 1923. Re. 15,520.

C. CONOVER.

APPARATUS FOR BRINGING ABOUT AND CONTROLLING REACTIONS BETWEEN GASES.

ORIGINAL FILED DEC. 9, 1919. 3 SHEETS—SHEET 2.

Inventor

Courtney Conover

Jan. 9, 1923. Re. 15,520.

C. CONOVER.

APPARATUS FOR BRINGING ABOUT AND CONTROLLING REACTIONS BETWEEN GASES.

ORIGINAL FILED DEC. 9, 1919.

3 SHEETS—SHEET 3.

Courtney Conover Inventor

Reissued Jan. 9, 1923.

Re. 15,520

UNITED STATES PATENT OFFICE.

COURTNEY CONOVER, OF CRAFTON, PENNSYLVANIA, ASSIGNOR TO JAMES M. SELDEN, OF PITTSBURGH, PENNSYLVANIA.

APPARATUS FOR BRINGING ABOUT AND CONTROLLING REACTIONS BETWEEN GASES.

Original No. 1,324,443, dated December 9, 1919, Serial No. 293,788, filed April 30, 1919. Application for reissue filed July 13, 1921. Serial No. 484,504.

(FILED UNDER THE ACT OF MARCH 3, 1883, 22 STAT. L., 625.)

*To all whom it may concern:*

Be it known that I, COURTNEY CONOVER, a citizen of the United States of America, residing in Crafton, county of Allegheny, and State of Pennsylvania, have invented a new and useful Apparatus for Bringing About and Controlling Reactions Between Gases, of which the following is a specification.

This application is made under the act of March 3, 1883, chapter 143 (22 Stat., 625), and the invention herein described and claimed may be used by the Government of the United States, or any of its officers or employees in the prosecution of work for the Government, and any person in the United States, without payment to me of any royalty thereon.

My invention relates to apparatus in which reactions between gases may be brought about, especially those reactions which are induced by catalysts and in which heat is generated.

The object of my invention is to provide a form of apparatus in which reactions between gases may be brought about, which shall be an improvement over existing forms in the following respects: provision is made for keeping the top and sides of the reaction chambers from becoming heated above a determined temperature; provision is also made for keeping the floor of the reaction chamber from becoming heated above a determined temperature, which temperature may be different from that of the top and walls if desired; construction of the apparatus is simplified by building it from a number of interchangeable units; provision is made for utilizing the heat evolved in the reaction between gases for heating the incoming gases sufficiently to start reaction.

One form of the apparatus is shown in the accompanying drawing:

Figure 1 is a section through the apparatus from front to rear.

Figure 2 is a cross section of one of the units of which the main part of the apparatus is built up.

Figure 3 is a section of the end of a unit with connections for circulation of cooling liquids.

Figures 4 and 7 are elevations of the end of a unit showing connections, while

The apparatus is to be constructed of material, preferably a metal, which will conduct heat readily and will not be corroded by the reacting gases.

The main part of the apparatus is built of interchangeable units, each unit consisting of a reaction chamber set in a jacket which is divided horizontally into two compartments for containing cooling liquids. The general structure of the unit is shown in Figure 2, the reaction chamber B being surrounded above and below and partially at the ends by compartments A and C. Heat insulating material may be placed between these compartments to prevent interchange of heat. The reaction chamber B, and compartment A may be supported on pillars W, from the floor of compartment C; and the roof of B may be strengthened by ribs T, (Fig. 1). Compartment C extends sidewise beyond compartment A, so as to provide room at each end for outlet and inlet connections for the circulation of liquids..

Figure 4:
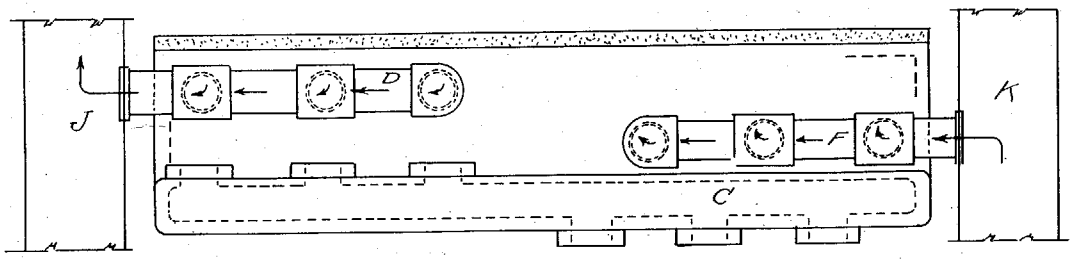
Figure 5:
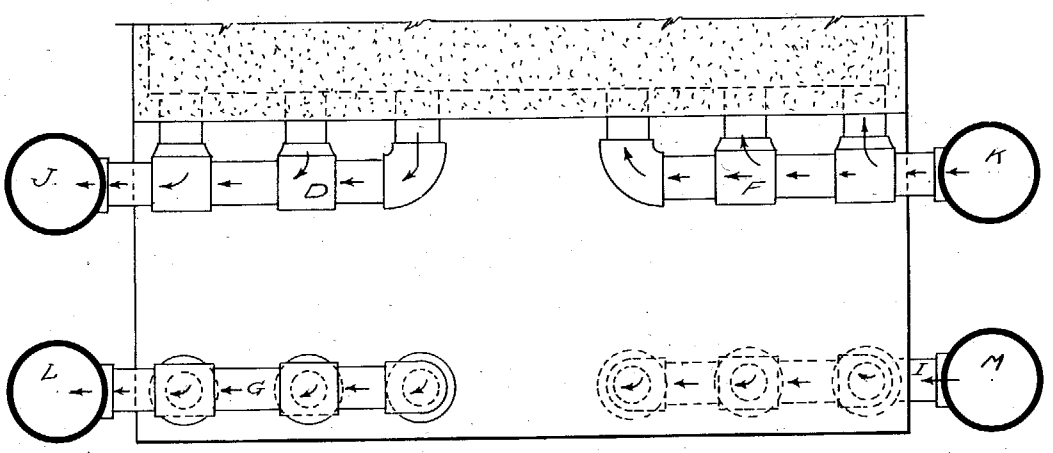
Figure 5 is a plan view of the same parts.
Figure 6:
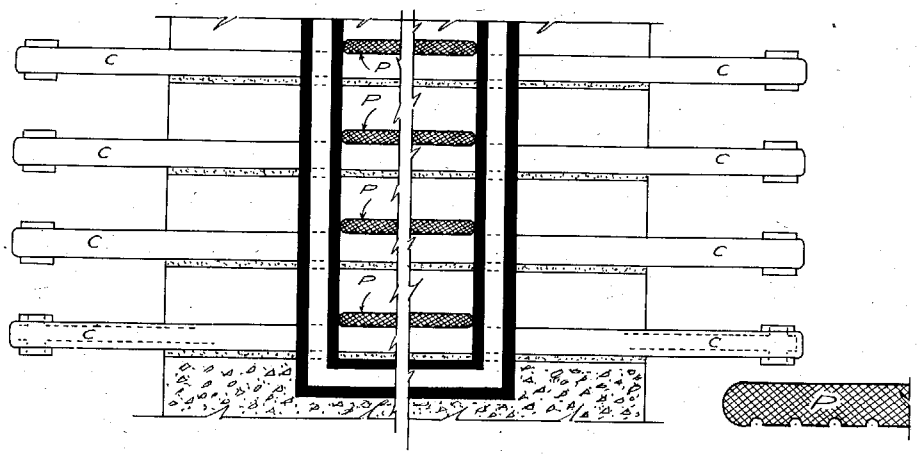
Figure 6 is a front elevation of several units assembled as for operation but without connections for cooling liquids.
Figure 7:
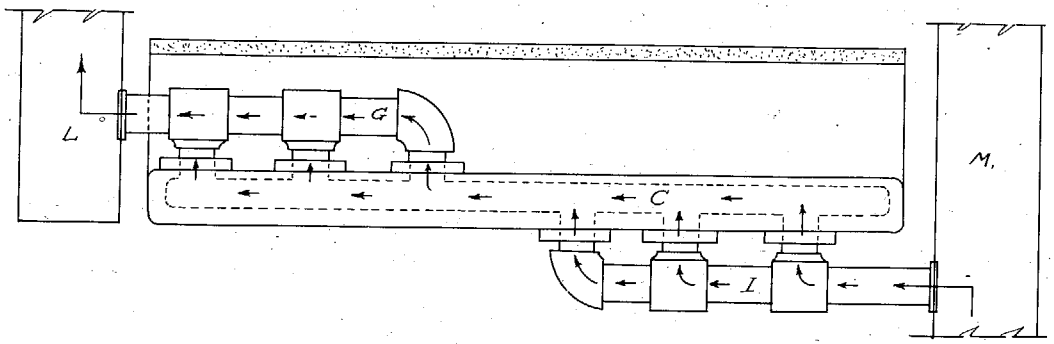

In Figure 1 several units are shown assembled. The reaction chambers are indicated by B. A and C are compartments for containing liquids which will absorb the heat formed in the reaction between gases and by boiling will automatically keep the floors and roofs of the reaction chambers at desired temperatures. R is a distributing chamber from which the gases which are to react flow into the reaction chambers, B, through narrow openings in the front walls, P, of the reaction chambers. In Fig. 6, also a front view is shown of several units assembled but without connections for cooling liquid. The distributing chamber R is shown in section with a double wall for steam or hot liquid, so it may be kept at a desired temperature. In this figure the front walls, P, of the reaction chambers are shown in the general view and in the inset.

The system for supplying liquids to the cooling compartments and drawing off the hot liquid or vapor is shown in Figs. 3, 4, 5 and 7. The cool liquids for all of the compartments A, and C, are supplied respectively from manifolds K and M (Fig.

5). The liquids enter both ends of each compartment through one or more openings near the bottom and in the rear half of the compartment and the hot liquids or vapors coming from each compartment are led off through one or more openings from the top and in the front half of the compartment.

It is essential that the outlets for the hot liquids or vapors should be out of or flush with the top of the compartment, in order that there shall be no trapping of vapor in the top of the compartment.

The hot liquids or vapors from a number of units are received in manifolds such as J and L, (Fig. 3) and rise into condensers and coolers not shown in the drawings, from which the cool liquids are returned to reservoirs to which the manifolds K and M are connected.

The level of the liquids in the manifolds must always be somewhat higher than the top of the highest compartment, so that the compartments shall be full at all times.

The operation of the apparatus is as follows: An apparatus consisting of several units as shown in Figs. 1 and 6 is heated by any suitable means until a temperature is reached which will start reaction between the gases which are to be introduced. These gases are then forced under some pressure into a distributing chamber R, through several openings such as S. The gases enter the reaction chambers B through small apertures in the front walls, P, of the reaction chambers. Since the gases in R, are under pressure they flow through the small apertures so as to be distributed uniformly across each reaction chamber if the apertures are uniform in diameter. The apertures for different reaction chambers may be made of different size so as to offset any difference in pressure in different parts of the chamber, R, due to the tendency of the hot gases to rise. On the floor of the chambers, B, a catalyst is placed, in the presence of which the gases react after being heated to a certain temperature which depends upon the nature of the gases and of the catalyst. The heat evolved in the reaction is absorbed to a great extent by the liquids in the compartments A and C. These liquids are mixed by convection currents or by boiling, hence they serve to convey heat from the middle and rear of the reaction chambers where it is mainly generated to the front, where heat is needed to raise the temperature of the incoming gases to the point at which reaction begins.

Since it is desirable to have all reaction chambers operating under the same conditions the front portions of the lowest cooling compartment may be heated from an outside source.

After reaction the gases flow out of the chambers B, into a receiver or condenser fitted onto the rear of the apparatus and not shown in the drawing.

Having thus fully described my invention, what I claim as new, and desire to secure by Letters Patent, is:—

1. In apparatus substantially as described for bringing about and controlling reactions between gases, the combination with reaction chambers, of separate compartments above and below the same, and cooling mediums of different boiling points in the different compartments.

2. In apparatus substantially as described for bringing about and controlling reactions between gases, the combination with a reaction chamber, of a compartment for holding a cooling medium, means for supplying reaction vapors to the reaction chamber, a cooling liquid in the reaction chamber that boils at the reaction temperature, and means for transferring to the incoming gases the heat of the vapors of the cooling liquid.

3. In apparatus substantially as described for bringing about and controlling reactions between gases, the combination with a reaction chamber, of a compartment for holding a cooling medium, means for supplying reaction vapors to the compartment, a cooling liquid in the reaction chamber that boils at the reaction temperature, and means for transferring to the incoming gases the heat of the vapors of the cooling liquid, and returning the cooling liquid after subjection to the incoming gases back to the zone of reaction.

4. In apparatus of the character set forth, the combination with a heat generating member, of a chamber for holding a liquid around said member and in heat-transferring relation thereto, and a liquid in said chamber that will boil at a temperature at which it is desired to maintain the heat generating member.

5. In apparatus for bringing about and controlling reactions between gases, the combination with a reaction chamber, of means for supplying reaction gases thereto, a liquid that will boil at the desired temperature of the reaction, and a container that holds said liquid in heat-transferring relation to the reaction chamber and the contents thereof.

6. In apparatus for bringing about and controlling reactions between gases, the combination with a plurality of catalyst-containing reaction chambers, of a common chamber connected thereto for supplying reaction gases to the reaction chambers, a cooling liquid that will boil at the desired temperature of the reaction, and means for holding said liquid in heat-exchanging relation to the catalyst and gases in the reaction chambers but out of direct contact therewith.

COURTNEY CONOVER.